US 11,351,668 B2

(12) United States Patent
Ziaylek

(10) Patent No.: US 11,351,668 B2
(45) Date of Patent: Jun. 7, 2022

(54) CAROUSEL-TYPE TOOL HOLDERS

(71) Applicant: Michael P. Ziaylek, Yardley, PA (US)

(72) Inventor: Michael P. Ziaylek, Yardley, PA (US)

( * ) Notice: Subject to any disclaimer, the term of this patent is extended or adjusted under 35 U.S.C. 154(b) by 150 days.

(21) Appl. No.: 16/776,196

(22) Filed: Jan. 29, 2020

(65) Prior Publication Data

US 2021/0229262 A1   Jul. 29, 2021

(51) Int. Cl.
*B25H 3/04* (2006.01)
*F16M 11/08* (2006.01)

(52) U.S. Cl.
CPC ............... *B25H 3/04* (2013.01); *F16M 11/08* (2013.01)

(58) Field of Classification Search
CPC ........... A62B 25/00; A62C 13/78; A62C 8/00; F17C 13/084; A47B 81/005; A47B 49/00; F16M 11/08; B25H 3/04
USPC ....... 211/1.53, 70, 77, 78, 80, 81, 70.6, 163, 211/165; 248/415, 418, 131
See application file for complete search history.

(56) References Cited

U.S. PATENT DOCUMENTS

| | | | | |
|---|---|---|---|---|
| 2,750,051 A | * | 6/1956 | Wassell | A47B 49/00 108/103 |
| 3,960,273 A | * | 6/1976 | Weston | A47F 7/0246 211/4 |
| 4,125,240 A | | 11/1978 | Heard | |
| 4,222,490 A | * | 9/1980 | Wood, Jr. | A63C 11/028 211/70.5 |
| 4,563,102 A | * | 1/1986 | Sanders, Jr. | B41J 11/58 312/208.2 |
| 4,688,685 A | * | 8/1987 | Brace | A63C 11/028 211/60.1 |
| D303,738 S | | 10/1989 | Ziaylek, Jr. | |
| 4,897,768 A | | 1/1990 | Thul | |
| 4,899,968 A | * | 2/1990 | Eaglin | A47F 5/02 211/78 |
| D352,870 S | * | 11/1994 | Eriksen | D6/680.2 |
| D361,924 S | | 9/1995 | Becker | |
| 5,681,080 A | * | 10/1997 | Pond | A62B 25/00 297/188.04 |
| 6,015,132 A | | 1/2000 | Belle | |
| 6,044,984 A | * | 4/2000 | Crosby | B25H 3/04 211/4 |
| 7,559,428 B2 | * | 7/2009 | Matzick | A47B 81/005 211/64 |
| 7,748,545 B2 | * | 7/2010 | Johnson | F17C 13/084 211/78 |

(Continued)

OTHER PUBLICATIONS

Fire & Marine Inc. Lazy Susan Turn Table—https://store.danko.net/Fire-and-Marine-Lazy-Susan-Turn-Table.html Publicly available prior to Jan. 29, 2020.

(Continued)

*Primary Examiner* — Patrick D Hawn
(74) *Attorney, Agent, or Firm* — Fox Rothschild LLP; Frank T. Carroll; Robert J. Sacco

(57) ABSTRACT

Carousel-type tool holders are provided for holding elongated tools such as hydraulic extrication tools. The tool holders can be equipped with spacers and extension plates that allow the tool holders to be configured to accommodate tools of different shapes and sizes. The tool holders also can be equipped with anti-rotation features that lock the rotating portion of the tool holder against rotation, while permitting the rotating portion to be unlocked quickly and with minimal effort.

10 Claims, 14 Drawing Sheets

(56) References Cited

U.S. PATENT DOCUMENTS

| | | | |
|---|---|---|---|
| 9,615,662 B1 | 4/2017 | Amber | |
| 10,791,830 B2* | 10/2020 | Lee | G06F 3/0488 |
| 2006/0261019 A1 | 11/2006 | Chao et al. | |
| 2013/0334269 A1 | 12/2013 | Cardonna et al. | |
| 2019/0320794 A1* | 10/2019 | Sanchez | A47B 43/00 |
| 2019/0381346 A1* | 12/2019 | Lenz, Jr. | B60R 5/003 |

OTHER PUBLICATIONS

End of the Road, Inc. Quick Fist Clamp—https://www.quickfist.com/index.php/quick-fist-mounts/quick-fist-clamp.html Publicly available prior to Apr. 9, 2019.

End of the Road, Inc. Ratchet Clamp—https://www.quickfist.com/index.php/quick-fist-mounts/quick-fist-ratchet-clamp.html Publicly available prior to Apr. 9, 2019.

Performance Advantage Company Handlelok mounting bracket—http://pactoolmountsredesign.localedgedemosite.com/product/handlelok-1004-2/ Publicly available prior to Apr. 9, 2019.

Performance Advantage Company Jumbo Lok mounting bracket—http://pactoolmountsredesign.localedgedemosite.com/product/jumbolok-1070/ Publicly available prior to Apr. 9, 2019.

Sensible Products Inc. Multi-Rack bracket—https://senpro.net/product/multi-rack/ Publicly available prior to Apr. 9, 2019.

* cited by examiner

CAROUSEL-TYPE TOOL HOLDERS

FIELD

The disclosed embodiments relate to carousel-type tool holders used to hold elongated tools such as hydraulic extrication tools.

BACKGROUND

Carousel-type tool holders are commonly used to hold elongated tools, such as hydraulic extrication tools. Hydraulic extrication tools are used by emergency responders to cut away portions of damaged vehicles during rescue operations. The tools are elongated, and include hydraulically-actuated cutting shears located at the forward end of the tool. The rearward portion of the tool typically includes the pumps, motors, and other equipment that provide the substantial force need to actuate the cutting shears. The presence of this equipment makes the rearward portion of the tool wider and heavier that the forward portion.

Hydraulic extrication tools usually are stored on carousel-type tool holders in an upright orientation, with the cutting shears facing downward and the rearward end of the tool facing upward. This mounting arrangement can facilitate the storage of four or more extrication tools in a side by side arrangement on a single tool holder. The portion of the tool holder on which the tools are positioned is rotatable, so that a particular tool or storage position can be conveniently accessed by a user by turning the rotating portion of the tool holder to cause the tool or storage to face the user.

Emergency vehicles such as fire engines commonly are equipped with multiple hydraulic extrication tools stored on carousel-type tool holders. Because the tools are often used in emergency situations, it is imperative that the tools be readily accessible to the first responders or other users. The tools need to be securely stowed, however, especially when being carried by emergency vehicles that routinely operate at high rates of acceleration and deceleration and at high turn rates, and over bumps and other road obstacles.

Many carousel-type tool holders have provisions, such as pins, bolts, or latches, to secure the rotating portion of the tool holder against rotation. The need to remove or actuate these provisions to unlock the rotating portion when accessing a particular tool, however, can delay time-critical rescue operations. This problem can be compounded in during operations at night, in bad weather, and under other low-visibility conditions often encountered by first responders. Also, the irregular shape of most hydraulic extrication tools can make it difficult to secure the tools to a tool holder, and to maintain the tools in the upright position needed to provide stability to the tools during transport. Securing the tools can be particularly challenging where a particular tool holder is used to hold different types of tools having disparate shapes and sizes.

SUMMARY

The present disclosure relates generally to carousel-type tool holders for holding one or more elongated tools such as hydraulic extrication tools. In one aspect, the disclosed technology relates to a carousel-type tool holder for holding one or more elongated tools. The tool holder includes a base; and a platform mounted for rotation on the base and configured to support the elongated tool. The tool holder also includes a column mounted on the platform and extending from the platform substantially in a vertical direction; a mount configured to restrain the elongated tool when the elongated tool is positioned on the platform; and a spacer mounted on the column. The mount is mounted on the spacer, and the spacer is configured to be secured to the column in a plurality of different horizontal positions in relation to the column so that a spacing between the mount and the column can be varied.

In another aspect of the disclosed technology, the spacer is a first spacer; the tool holder further includes a second spacer; the mount is mounted on the first and second spacers; the column has a first wall, a second wall positioned opposite the first wall, and a third wall adjoining the first and second walls; the first spacer is mounted on the first wall; the second spacer is mounted on the second wall; and the first and second spacers are configured to be secured to the column in a plurality of different horizontal positions in relation to the column so that a spacing between the mount and the third wall can be varied.

In another aspect of the disclosed technology, the spacer has a first portion, and a second portion that adjoins the first portion and extends substantially perpendicular to the first portion; the mount is attached to the second portion; the first portion has a slot formed therein and extending substantially in the horizontal direction when the spacer is mounted on the column; and the slot is configured to receive at least one fastener that secures the spacer to the column. In another aspect of the disclosed technology, the column includes a wall having a plurality of holes formed therein and located a different vertical positons; and the holes are configured to receive the fastener so that a vertical position of the spacer and the mount in relation to the column can be varied.

In another aspect of the disclosed technology, the tool holder further includes an extension plate configured to be mounted on the column so that a portion of the extension plate extends higher than an uppermost surface of the column; the mount is a first mount; and the tool holder further includes a second mount mounted on the extension plate.

In another aspect of the disclosed technology, the column includes a wall having a plurality of holes formed therein and located at different vertical positions; the extension plate has a plurality holes formed therein and arranged in a pattern that substantially matches a pattern of the holes in the column; and the extension plate is configured to be attached to the wall by fasteners disposed in two or more of the holes in the wall and two or more of the holes in the extension plate.

In another aspect of the disclosed technology, the tool holder further includes a hanging ram assembly mounted on the column and defining a channel; the spacer has a first portion, and a second portion that adjoins the first portion and extends substantially perpendicular to the first portion; the mount is attached to the second portion; and the first portion is positioned at least in part within the channel.

In another aspect of the disclosed technology, the spacer is a first spacer and the tool holder further includes a second spacer; the mount is a first mount and the tool holder further includes a second mount mounted on the second spacer; the column includes a first wall and an opposing second wall; the first mount faces the first wall and the second mount faces the second wall; and the first portion of the first spacer and a first portion of the second spacer are positioned with the channel in an overlapping relationship.

In another aspect of the disclosed technology, the tool holder further includes a third mount mounted on the hanging ram assembly.

In another aspect of the disclosed technology, the hanging ram assembly includes a first major portion attached to the column, a second major portion attached to the column, and an intermediate portion; the intermediate portion has a first side portion that adjoins the first major portion at an approximate right angle, a second side portion that adjoins the second major portion at an approximate right angle, and a top portion that adjoins first side portion and the second side portion at an approximate right angle; and the first side portion, the second side portion, and the top portion define the channel.

In another aspect of the disclosed technology, the tool holder further includes a tool tip rest configured to receive an end of the tool, and a riser mounted on the platform; and the tool tip rest is mounted on the riser and the riser is configured to elevate the tool tip rest in relation to the platform.

In another aspect of the disclosed technology, the tool holder further includes a shaft mounted on the base, an upper bearing assembly mounted on the shaft proximate an upper end of the shaft, and a lower bearing assembly mounted on the shaft proximate a lower end of shaft; and the column is connected to the upper and lower bearing assemblies and is configured to rotate in relation to the shaft by way of the first and second bearing assemblies.

In another aspect of the disclosed technology, carousel-type tool holders include a base; a platform mounted for rotation on the base, configured to support an elongated tool, and having an opening formed therein; a column mounted on the platform; a mount connected to the column and configured to restrain the elongated tool when the elongated tool is positioned on the platform; a locking tab secured to the base; and a projection mounted on locking tab. The projection and the locking tab are configured so that the projection aligns with and becomes disposed in the opening when the platform is located at a predetermined angular position in relation to the base, and interference between the pin and the platform prevents substantial rotation of the platform in relation to the base.

In another aspect of the disclosed technology, the opening is a first opening and the platform has a second opening formed therein; the predetermined angular position of the platform in relation to the base is a first predetermined angular position of the platform in relation to the base; and the projection and the locking tab are further configured so that the projection aligns with and becomes disposed in the second opening when the platform is located at a second predetermined angular position in relation to the base.

In another aspect of the disclosed technology, the platform has a third and a fourth opening formed therein; the projection and the locking tab are further configured so that the projection aligns with and becomes disposed in the third opening when the platform is located at a third predetermined angular position in relation to the base, and the projection aligns with and becomes disposed in the fourth opening when the platform is located at a forth predetermined angular position in relation to the base; the first opening is angularly spaced from the second and the fourth openings by about 90 degrees; the second opening is angularly spaced from the third opening by about 90 degrees; and the third opening is angularly spaced from the fourth opening by about 90 degrees.

In another aspect of the disclosed technology, the locking tab and the projection are further configured so that the locking tab can be pushed downwardly to move the projection out of the opening.

In another aspect of the disclosed technology, the locking tab includes a first portion secured to the base and having a substantially horizontal orientation; a second portion adjoining the first portion and having a substantially vertical orientation; and a third portion adjoining the second portion and having a substantially horizontal orientation; and the projection is mounted on the third portion.

In another aspect of the disclosed technology, the third portion of the locking tab extends beyond an outer circumference of the platform.

In another aspect of the disclosed technology, the locking tab extends beneath the platform.

In another aspect of the disclosed technology, the projection is an index pin.

BRIEF DESCRIPTION OF THE DRAWINGS

The accompanying drawings, which are incorporated herein and constitute part of this specification, are illustrative of particular embodiments of the present disclosure and do not limit the scope of the present disclosure. The drawings are not to scale and are intended for use in conjunction with the explanations in the following detailed description.

DETAILED DESCRIPTION

Figure 1:
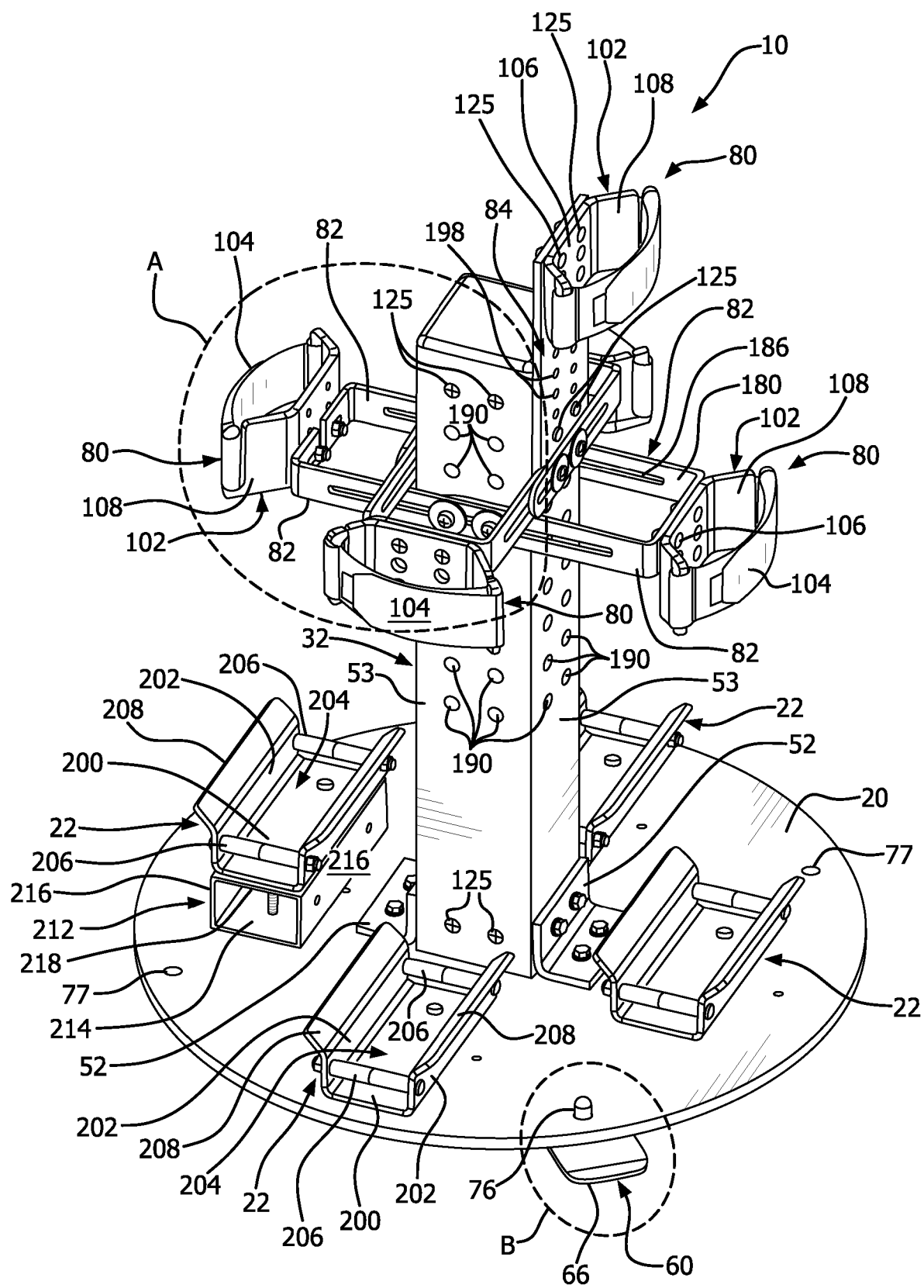
FIG. 1 is perspective view of a tool holder.

The following discussion omits or only briefly describes conventional features of the disclosed technology that are apparent to those skilled in the art. It is noted that various embodiments are described in detail with reference to the drawings, in which like reference numerals represent like parts and assemblies throughout the several views. Reference to various embodiments does not limit the scope of the claims appended hereto. Additionally, any examples set forth in this specification are intended to be non-limiting and merely set forth some of the many possible embodiments for the appended claims. Further, particular features described herein can be used in combination with other described features in each of the various possible combinations and permutations.

Figure 2:
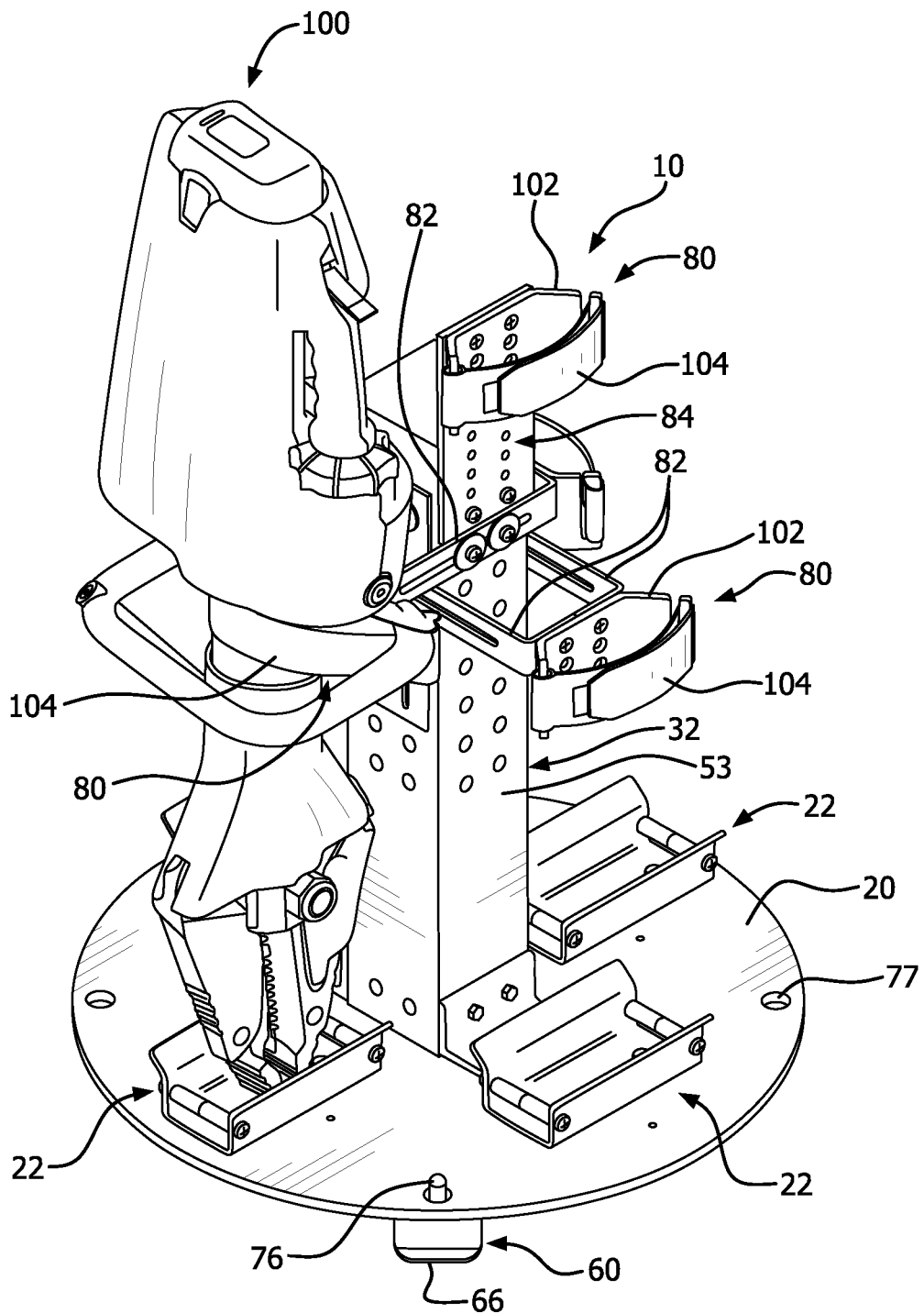
FIG. 2 is a perspective view of the tool holder shown in FIG. 1, with a hydraulic extrication tool mounted on and secured to the tool holder.

FIGS. 1-17 depict a carousel-type tool holder 10. The tool holder 10 can be used to store multiple tools 100 or other devices. The tools can be, for example, hydraulic extrication tools used by emergency responders to cut away portions of damaged vehicles during rescue operations. As noted above, a typical hydraulic extrication tool has an elongated configuration, with cutting shears located at the front of the tool as shown in FIG. 2; and the rearward portion of the tool housing the pumps, motors, and other equipment that actuate the cutting shears.

The tool holder 10 can be positioned on a static, or non-moving surface, such as the floor of a firehouse. The tool holder 10 also can be positioned on a moving surface, such as a floor of an equipment bay in a fire engine or other type of emergency vehicle.

Figure 3:
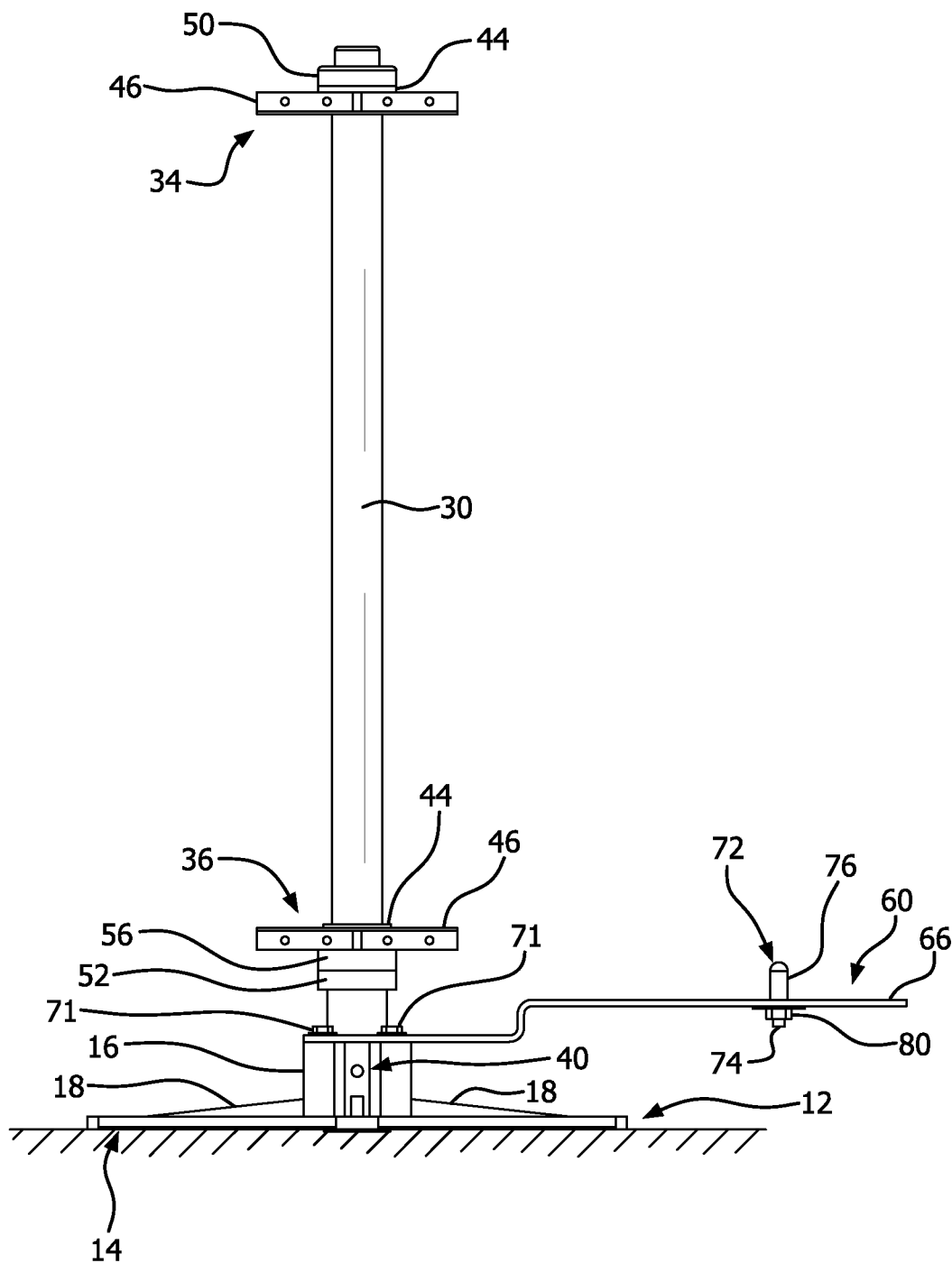
FIG. 3 is a side view of the tool holder shown in FIGS. 1 and 2, with a column and a rotating platform of the tool holder removed for purposes of illustration.

Referring to FIG. 3, the tool holder 10 comprises a base 12. The base 12 is configured to rest on a floor or other supporting surface for the tool holder 10; and supports the remainder of the tool holder 10. The base 12 includes a substantially flat, substantially circular major portion 14, and a cylindrical collar 16. The collar 16 adjoins the major portion 14, and is located at the approximate center of major portion 14. The base 12 also includes a plurality of webs 18 that adjoin the major portion 14 and the collar 16; and extend radially outward from the collar 16.

The tool holder 10 also comprises a rotating platform 20. As can be seen in FIG. 1, the platform 20 is substantially flat, and substantially circular. The platform 20 is configured to rotate in relation to the base 12, and supports the tools 100.

The tool holder 10 also comprises a plurality of tool tip rests 22. The tool tip rests 22 are securely mounted on an upper surface of the platform 20, as shown in FIG. 1. Each tool tip rest 22 receives an end of one of the tools 100; and helps to restrain the end of the tool 100 from substantial lateral movement, i.e., from substantial movement parallel to the upper surface of the rotating platform 20.

Referring to FIG. 3, the tool holder 10 further comprises a shaft 30; a column 32; an upper bearing assembly 34; and a lower bearing assembly 36. A lower end of the shaft 30 is positioned within the collar 16 of the base 12. The inner circumference of the collar 16 is sized so that the lower end of the shaft 30 fits snugly within the collar 16, with minimal clearance between the outer circumference of the shaft 30 and the inner circumference of the collar 16. The shaft 30 is retained in the collar 16 by a spring-biased pin 40 located within the shaft 30. The pin 40 engages the collar 16 by way of a through hole 42 in the shaft 30. The pin 40 prevents the shaft 30 from rotating in relation to the collar 16, and prevents the shaft 30 from being withdrawn upward, out of the collar 16.

The upper bearing assembly 34 and the lower bearing assembly 36 each comprise a bearing 44, and a bearing plate 46. The bearings 44 are concentrically disposed around the shaft 30. The bearing 44 associated with the upper bearing assembly 34 is positioned proximate an upper end of the shaft 30; the bearing 44 associated with the lower bearing assembly 36 is positioned proximate a lower end of the shaft 30. An inner race of the each bearing 44 is secured to an outer circumference of the shaft 30 by an interference fit or other suitable means. An outer race of each bearing 44 is secured to an inner circumference of a corresponding one of the bearing plates 46 by an interference fit or other suitable means, so that the bearing plates 46 can rotate in relation to the shaft 30 and the base 12. The outer circumference of each bearing plate 46 is substantially square, when viewed from above.

The tool holder 10 also comprises a first collar 50 positioned around the shaft 30, directly above the bearing 44 of the upper bearing assembly 34. The tool holder 10 further includes a spacer tube 56 positioned around the shaft 30, directly below the bearing 44 of the lower bearing assembly 36; and a second collar 52 positioned around the shaft 30, between the spacer tube 56 and the collar 16 of the base 12.

Referring to FIG. 1, the column 32 includes four adjoining walls 53, and has a substantially square outer perimeter when viewed from above. The bearing plates 46 are configured so that the column 32 fits snugly over the bearing plates 46, with minimal clearance between the inner perimeter of the column 32 and the outer perimeters of the respective bearing plates 46. The column 32 is secured to the bearing plates 46 by fasteners 125 or other suitable means, so that the column 32 is supported by, and rotates with the bearing plates 46. The rotating platform 20 is suspended from the lower end of the column 32 by L-shaped brackets 52 secured to the column 32 and the platform 20 by fasteners or other suitable means.

The tool holder 10 also comprises a plurality of mounts 80. The mounts 80 are mounted on the column 32; and are configured to restrain the tools 100 being stowed on the tool holder 10. As discussed below, the positions of the mounts 80 in relation to the column 32 can be varied using spacers 82 and extension plates 84, so that the points of restraint on the tools 100 can be tailored to the specific shapes and dimensions of different tools 100.

a. Locking Tab

Figure 10:
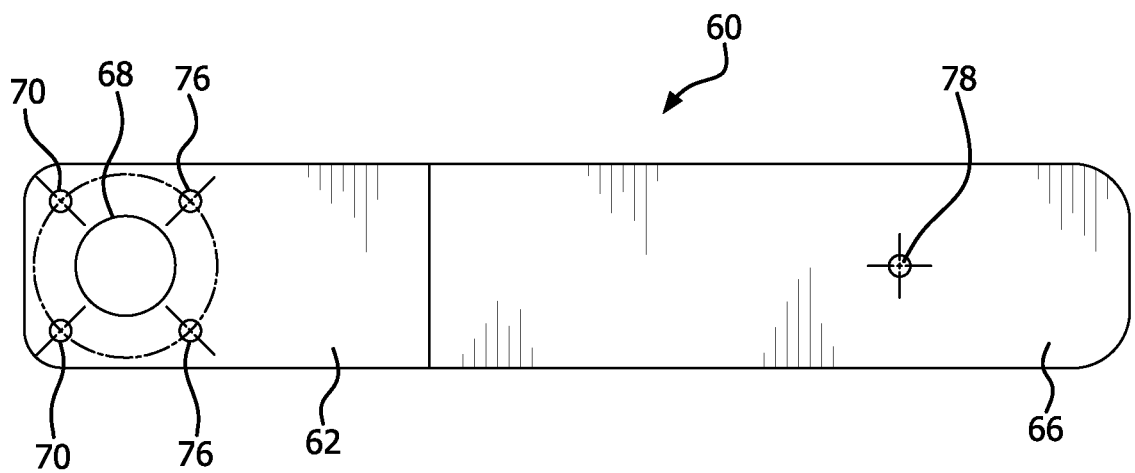
FIG. 10 is a top view of a locking tab of the tool holder shown in FIGS. 1-4.
Figure 11:
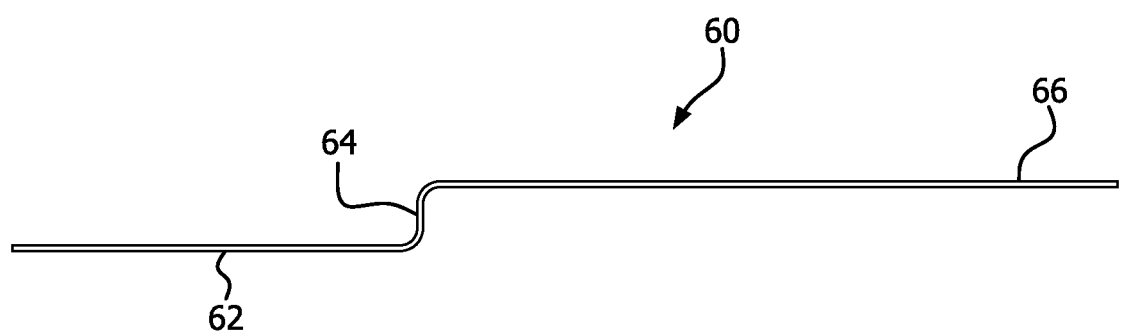
FIG. 11 is a side view of the locking tab shown in FIG. 10.

Referring to FIGS. 1, 3, 10, and 11, the tool holder 10 has a locking tab 60 that selectively prevents the platform 20 and the column 32 from rotating in relation to the base 12. As shown in FIGS. 10 and 11, the locking tab 60 is elongated, and is formed from a thin strip of material such as aluminum. The locking tab 60 has a first portion 62; an adjoining second portion 64; and a third portion 66 that adjoins the second portion 64.

As can be seen in FIG. 3, the locking tab 60 is positioned on the shaft 30. The first portion 62 of the locking tab 60 has a centrally-located hole 68 formed therein, as shown in FIG. 10. The hole 68 receives the shaft 30. The hole 68 is sized so that the shaft 30 fits snugly within the hole 68, with minimal clearance between the outer circumference of the shaft 30 and the adjacent surface of the first portion 62.

The first portion 62 of the locking tab 60 is positioned between the collar 16 of the base 12, and the spacer tube 56. The first portion 62 has four smaller holes 70 formed therein, as illustrated in FIG. 10. The holes 70 are located radially outward of the central hole 68; and each hole 70 aligns with a corresponding threaded bore (not shown) in the collar 16 of the base 12. Each hole 70 and its corresponding bore receive a threaded fastener 71, as shown in FIG. 3. The fasteners 71 secure the first portion to the 62 to the collar 16; and prevent the locking tab 60 from rotating in relation to the base 12.

The second portion 64 of the locking tab 60 has a substantially vertical orientation when viewed from the perspective of FIG. 11. The first and third portions 62, 66 each have a substantially horizontal orientation when viewed from the perspective of FIG. 11. The second portion 64 acts as a step that elevates the third portion 66 to a position proximate the underside of the rotating platform 20, as can be seen in FIG. 3.

Figure 12:
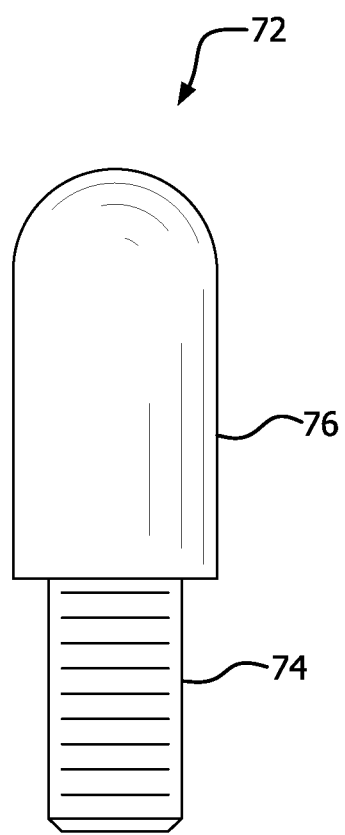
FIG. 12 is a side view of an index pin of the tool holder shown in FIGS. 1-4.

A projection in the form of an index pin 72 is securely mounted on the locking tab 60. As illustrated in FIG. 12, The index pin 72 has a threaded first portion 74, and an adjoining second portion 76. The first portion 74 is positioned in a hole 78 formed the third portion 66 of the locking tab 60, proximate the outer end of the third portion 66. The second portion 76 of the index pin 72 has an outer diameter greater than the diameter of the hole 78, so that the second portion 76 engages, and extends upward from the upper surface of the third portion 66 of the locking tab 60, as shown in FIG. 3. The index pin 72 is secured to the third portion 66 by a fastener 80 that engages the underside of the third portion 66.

Figure 13:
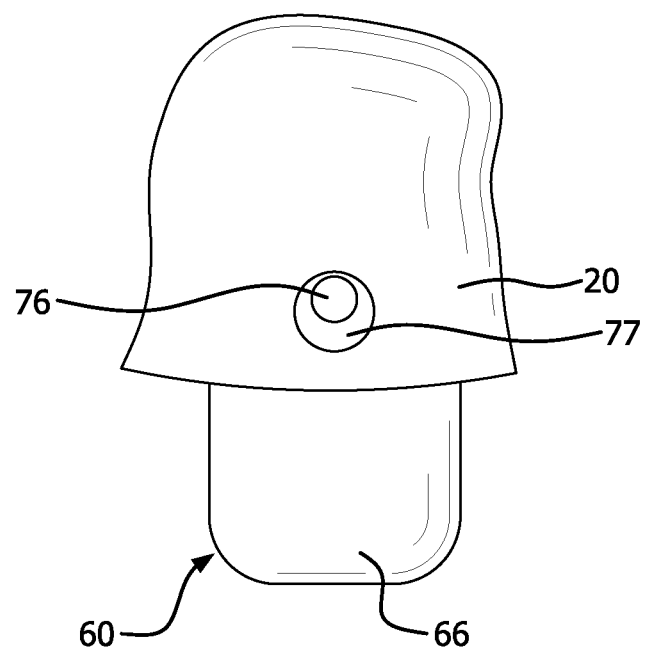
FIG. 13 is a magnified top view of the area designated "B" in FIG. 1.

The rotating platform 20 has four openings in the form of through holes 77 formed therein, proximate an outer circumference of the platform 20. Three of the holes 77 are visible in FIG. 1. Each through hole 77 is angularly spaced from its adjacent through holes 77 by about 90 degrees. Each through hole 77 aligns with the index pin 72 when the platform 20 is located at a specific angular position in relation to the locking tab 60 and the base 12. The locking tab 60 is configured so that the second portion 76 of the index pin 72 enters, and extends upward through a particular through hole 77 when the rotating platform 20 reaches an angular position that causes the through hole 77 to align with the index pin 72, as shown in FIGS. 1 and 13. The resulting interference between the second portion 76 of the index pin 27 and the platform 20 prevents rotation of the platform 20 in relation to the locking tab 60 and the base 12, thereby locking the platform 20 and the column assembly 26 in that particular angular position.

The locking tab 60 is configured so that third portion 66 of the locking tab 60 extends beyond the outer circumference of the rotating platform 20, as can be seen in FIG. 1. The platform 20 can be released from the restraining effect of the index pin 72 by manually pushing downward on the outer end of the locking tab 60, so that the second portion 76 of the index pin 72 moves downward, and out of the through hole 77. The platform 20 can be rotated by the user once the second portion 76 has exited the through hole 77.

Upon being unlocked, the rotating platform 20 can be rotated to another angular position at which another of the through holes 77 aligns with the index pin 72. For example, a user may wish to rotate the platform 20 to a different angular position to access a particular one of the tools 100 located at a position facing away from the user. Once the through hole 77 and the index pin 72 are aligned, the user can release the locking tab 60, i.e., the user can cease applying downward pressure to the third portion 66 of the locking tab 60. Once the locking tab 60 is released, the resilience of the locking tab 60 will cause the third portion 66 of the locking tab 60, and the attached index pin 72, to move upward so that the second portion 76 of the index pin 72 enters the through hole 77. At this point, the rotating platform 20 and the column 32 are again locked in position in relation the base 12 by interference between the index pin 70 and the platform 20. The locking tab 60 and the index pin 72 thus securely lock the platform 20 and the column 32 in place, while permitting the platform 20 and the column 32 to be released manually, without any need to remove fasteners, locking pins, etc. Also, the end of the third portion 66 of the locking tab 60 can be located easily by the user under low-visibility conditions; and can be easily manipulated by the user to release the platform 20 and the column 32 and quickly access one of more of the tools 100 under exigent circumstances.

The platform 20 can have more, or less than four of the holes 78 in alternative embodiments, to permit the platform 20 and the column 32 to be locked in more, or less than four angular positions. Also, the projection on the locking tab 60 can have a form other than the index pin 72 in alternative embodiments.

b. Mounts

Referring to FIGS. 5-9, each mount 80 includes a bracket 102 and a strap 104. The bracket 102 comprises a mounting portion 105. The mounting portion 105 has a first section 106, a second section 108 that adjoins the first section 106, and a third section 110 that adjoins the first section 106. The second section 108 and the third section 110 are located on opposite sides of the first section 106, as can be seen in FIGS. 5-8.

The first section 106 has a substantially planar major surface 137; and the second section 108 has a substantially planar major surface 138. The major surface 138 is oriented at acute angle, denoted "$\alpha_1$" in FIG. 8, in relation of the major surface 137. The third section 110 has a substantially planar major surface 139. The major surface 139 is oriented at acute angle, denoted "$\alpha_2$" in FIG. 8, in relation of the major surface 137.

Referring to FIGS. 5-9, the bracket 102 also includes a first arm 112 and a second arm 114. A first end of the first arm 112 adjoins the second section 108 of the mounting portion 105; a second end of the first arm 112 is freestanding. The first arm 112 and the second section 108 define a gap 116. The second end of the first arm 112 has a lip 118 formed thereon.

A first end of the second arm 114 adjoins the third section 110 of the mounting portion 105; a second end of the second arm 114 is freestanding. The second arm 114 and the third section 110 define a gap 120. The second end of the first arm 112 has a lip 122 formed thereon. The bracket 102 can be formed from aluminum. Other suitable materials, such as high-strength plastic, can be used in the alternative. The first section 106, second section 108, third section 110, first arm 112, and second arm 114 are unitarily formed. Some, or all of these items can be formed separately, and can be connected by a suitable means such as fasteners, adhesive, or welding, in alternative embodiments.

The bracket 102 can be secured to the spacers 82 or the extension plate 84 by fasteners 125. The bracket 102 also can be secured directly to one of the walls 53. The first section 106 of the mounting portion 105 has six holes 124 formed therein to accommodate the fasteners 125, as can be seen in FIGS. 10-12. Less than six fasteners 125 can be used to secure the bracket 10, The first section 106 is provided with six of the holes 124 to provide flexibility in the placement of the bracket 100 on the spacers 82, the mounting plate 82, or the walls 53. Alternative embodiments can include less, or more than six of the holes 124.

Each wall 53 of the column 32 has two vertically-oriented columns of threaded mounting holes 190 formed therein, as can be seen in FIG. 1. The holes 190 are configured to receive the fasteners 125. Each pair of opposing holes 190 in the two columns is spaced by a distance about equal to the spacing between the pairs of opposing holes 124 in the first section 106 of the mounting portion 105, so that each hole 190 can align with a corresponding hole 124.

Figure 4:
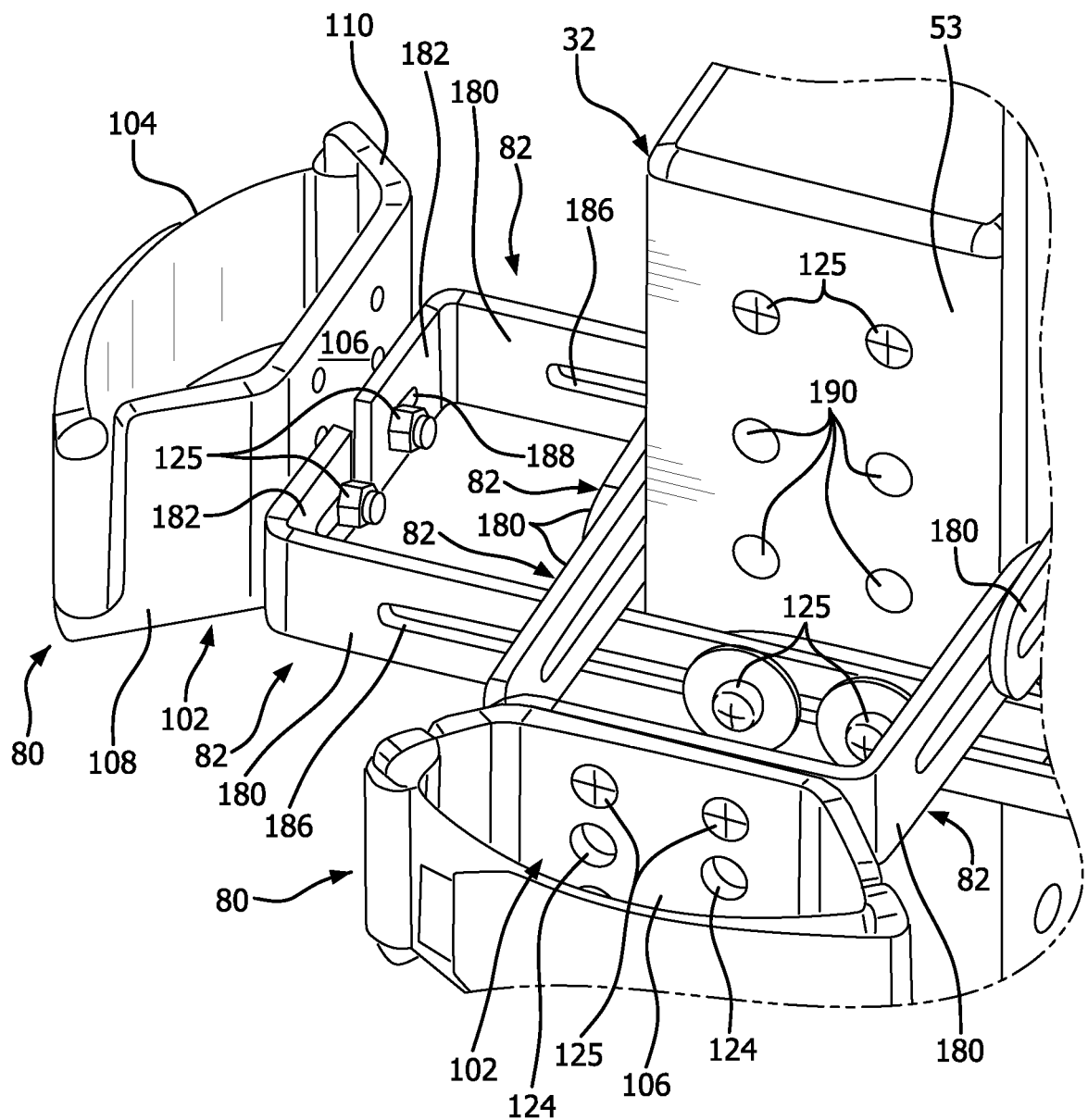
FIG. 4 is a magnified view of the area designated "A" in FIG. 1.
Figure 5:
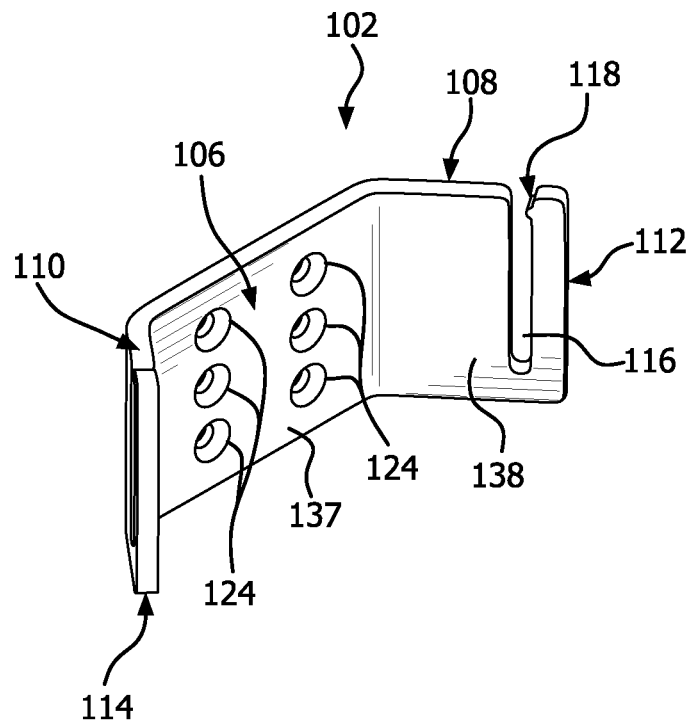
FIG. 5 is a top-left perspective view of a bracket of a mount of the tool holder shown in FIGS. 1-4.
Figure 6:
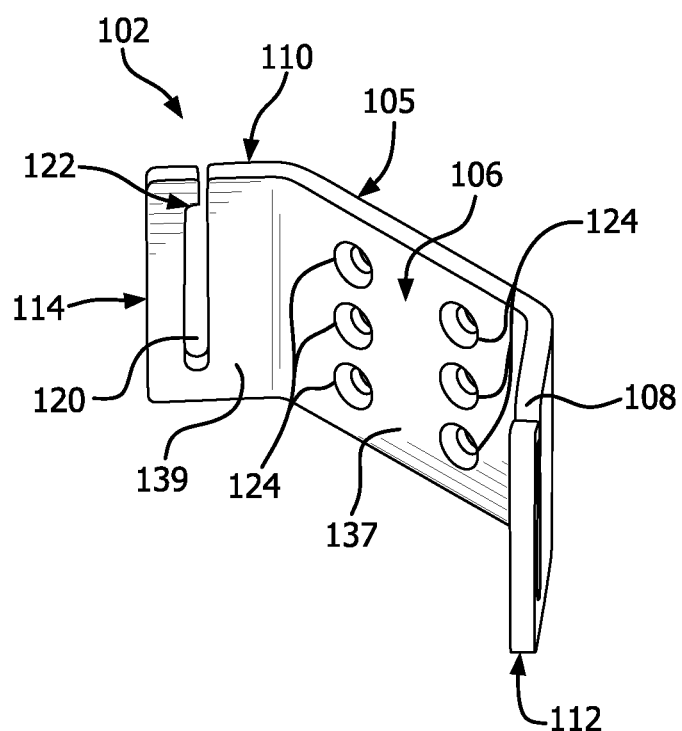
FIG. 6 is a top-right perspective view of the bracket shown in FIG. 5.
Figure 7:
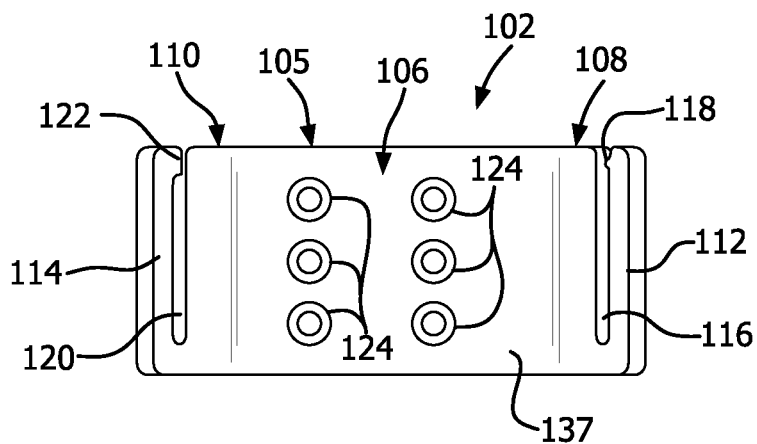
FIG. 7 is a front view of the bracket shown in FIGS. 5 and 6.

The bracket 102 can be secured to the spacers 82, the extension plate 84, or the walls 53 of the column 32 in a substantially horizontal orientation, i.e., with the first and second arms 112, 114 located to the right and left of the first section 106 of the mounting portion 105, respectively; and with the freestanding ends of the first and second arms 112, 114 forming the respective upper ends of the first and second arms 112, 114, as shown in FIGS. 1 and 4. This orientation accommodates a mounting arrangement in which the elongated tool 100 is disposed in a substantially vertical orientation, with a first end of the tool 100 resting in, and restrained by, one of the tool tip rests 22; while the mount 80 restrains a second end of the tool 100 from substantial lateral, i.e., horizontal, movement. Thus, the weight of the tool 100 is borne primarily by the platform 20 of the tool holder 10, rather than the mount 80. In the example illustrated herein, the tool 100 is stowed with the cutting shears of the tool 100 disposed in the tool tip rest 22, and the larger and heavier rearward portion of the tool 100 located above the cutting shears as shown in FIG. 2.

The strap 104 has a first end 130 and a second end 132. A pull tab 134 can be attached to the second end 132. A pad 136 is secured to a first side of the strap 104. The pad 136 can be formed from a soft, durable material such as neoprene. Alternative embodiments can be constructed without the pad 136.

A strip of hook and loop fasteners 148 is attached to a second side of the strap 104. The hook and loop fasteners 148 can be, for example, VELCRO®. The strip 148 has a first portion 150 and a second portion 152. The first portion 150 extends from the first end 130 of the strap 104, and spans about two-thirds of the overall length of the strap 104. The second portion 152 extends from the second end 132 of the strap 104, and spans the remaining length of the strap 104. The relative spans of the first portion 150 and the second portion 152 can vary in alternative embodiments. The first portion 150 includes the loop fasteners of the strip 148; the second portion 152 includes the hook fasteners that securely mate with the loop fasteners when the hook fasteners are brought into contact with the loop fasteners. The hook and loop fasteners hold the strap 104 in a folded state, shown in FIGS. 1 and 4. The relative positions the loop fasteners and the hook fasteners on the strap 104 can be reversed in alternative embodiments.

Figure 9:
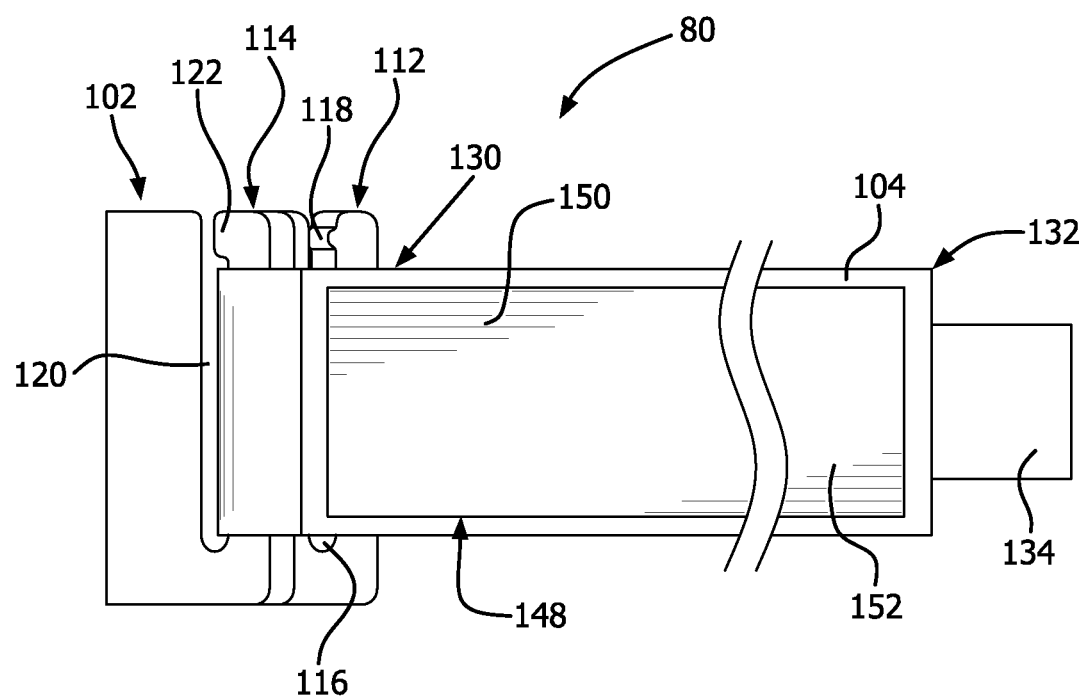
FIG. 9 is a left view of the bracket and strap shown in FIGS. 5-8, depicting the strap in the unfolded state.

The first end 130 of the strap 104 has a permanent loop sewn therein. The loop is positioned over the second arm 114, as can be seen in FIGS. 1, 4, and 9. The gap 120 between the second arm 114 and the third section 110 of mounting portion 105 allows the loop to fit between the second arm 114 and the third section 110, so that the loop can be inserted over, and onto the second arm 114 by way of the freestanding end of the second arm 114. The strap 104 has a width that causes the strap 104 to lie inside of the lip 122, i.e., between the lip 122 and the fixed, or non-freestanding end of the second arm 114, as shown in FIG. 9. The lip 122 locally reduces the gap 120 to a value about equal to, or slightly less than the thickness of the strap 104. Thus, the lip 122 retains the first end 130 of the strap 104 on the second arm 114, while permitting the loop on the first end 130 to be removed from, and inserted onto the second arm 114 to facilitate removal and replacement of the strap 104 by the user.

Figure 8:
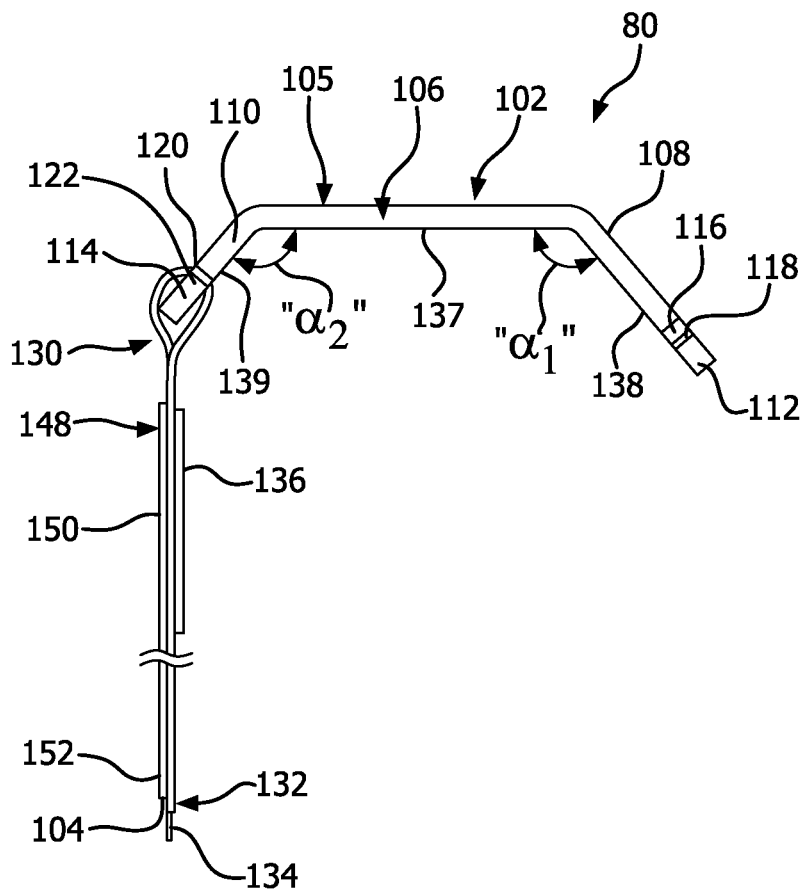
FIG. 8 is a top view of the bracket shown in FIGS. 5-7, depicting a strap of the mount in an unfolded state.

The tool 100 can be secured to, and held in place by the mount 80 as follows. The strap 104 initially is placed in its unfolded state, as shown in FIGS. 8 and 9. The tool 100 can be positioned so that its forward, or cutting end is positioned in one of the tool tip rests 22; and its rearward end is positioned against the first section 106 of the mounting portion 105 of one of the brackets 100, as illustrated in FIG. 2. In applications where the tool 100 is relatively wide, the tool 100 also may rest against the second section 108 and/or the third section 110 of the mounting portion 105.

The strap 104 is folded and secured in its folded state once the tool 100 has been positioned against the bracket 102. To fold the strap 104, the user grasps the pull tab 134 and/or the second end 132 of the strap 104, and pulls the strap 104 taunt. The user then moves the pull tab 134 and/or the second end 132 generally to the side, toward the first arm 112, while maintaining tension in the strap 104. This action causes the strap 104 to rotate about the second arm 114 of the bracket 102.

As the strap 104 rotates toward the second arm 114, the pad 136 moves into contact with the extrication tool 140. Further rotation of the strap 104 moves the second end 132 of the strap 104 into proximity with the first arm 112 of the bracket 102. At this point, the user moves the strap 104 upward, so that the strap 104 clears the first arm 112. A portion of the strap 104 is then aligned with, and inserted into the gap 116 between the first arm 112 and the second section 108 of the mounting portion 105. The flexibility of the strap 104, and the freestanding configuration of the second end of the first arm 112, allow the strap 104 to be positioned between the first arm 112 and the second section 108 quickly and easily, without the necessity of feeding the strap 104 lengthwise through the gap 116. This characteristic can be particularly advantageous when a particular strap is relatively long, like the strap 104, in order to secure relatively heavy item such as the tool 100. The tool holder 10 can be provided with additional, shorter straps 104 for one or more of the mounts 80 to accommodate smaller tools 100.

Figure 14:
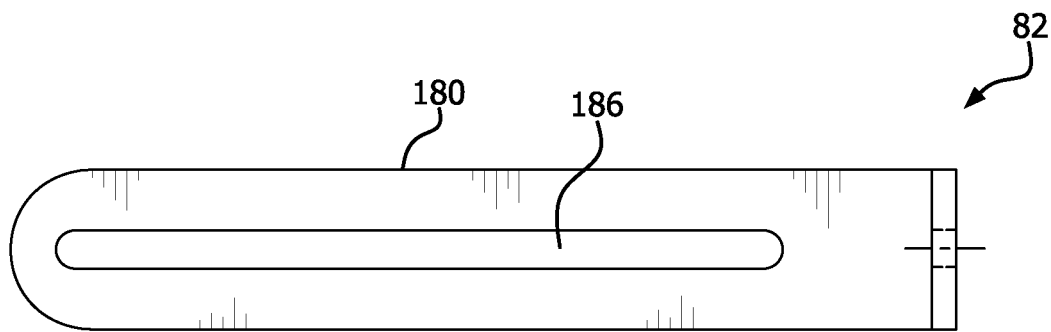
FIG. 14 is a side view of a spacer of the tool holder shown in FIGS. 1-4.
Figure 15:
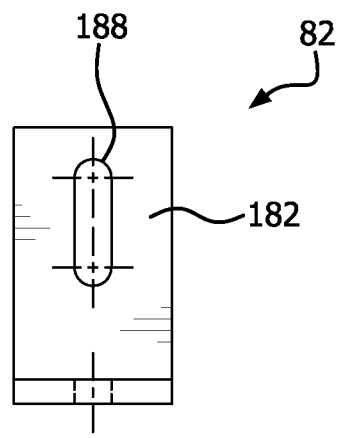
FIG. 15 is a rear view of the spacer shown in FIG. 14.
Figure 16:
FIG. 16 is a top view of the spacer shown in FIGS. 14 and 15.

Once inserted in the gap 116, the strap 104 lies inside of the lip 118 on the second arm 114, i.e., between the lip 118 and the fixed, or non-freestanding end of the first arm 112, as can be seen in FIG. 14. The lip 118 locally reduces the gap 116 to a value about equal to, or slightly less than the thickness of the strap 104, and thus helps to retain the second end 132 of the strap 104 on the first arm 112.

The user next pulls the second end 132 of the strap 104 back toward the user while maintaining tension in the strap 104. This causes the second end 132 to rotate around the first arm 112. The second end 132 is then moved back toward the second arm 114, which causes the strap 104 to progressively wrap around the first arm 112 and fold back on itself. Continued rotation of the strap 104 eventually brings the first and second portions 150, 152 of the strip of hook and loop fasteners 148 into contact with each other. The user then can press on the strap 104 to further urge the hook fasteners on the second portion 152 of the strip 148 into secure engagement with the loop fasteners on the first portion 150 of the strip 148. The relatively long length, or side to side dimension, of the second section 108 of the mounting portion 105, which can be seen in FIG. 8, can help the user to impart sufficient tension in the strap 104 to secure a relatively large and heavy object such as the extrication tool 140.

At this point, the upper portion of the tool 140 (from the perspective of FIG. 2) has been secured to the bracket 80, which in turn secures the tool 100 to the column 32. The upper portion of the tool 140 is secured from moving generally outward by the strap 104, which in turn is restrained by the first arm 112 and the second arm 114. Also, the strap 104, along with the second section 108 and the third section 110 of mounting portion 105, help to restrain the upwardly-oriented portion of the tool 140 from side to side movement.

Further details of the mounts 80 are contained in U.S. application Ser. No. 16/379,395, the contents of which are incorporated by reference herein in their entirety. Also, specific details of the mounts 80 are presented for illustrative purposes only; the tool holder 10 can be configured with other types of mounts, and other types of provisions for securing the tools 100 to the column 32, such as but not limited to latches, straps, commercially-available locking tool holders, etc.

b. Spacers Referring to FIGS. 1, 3, and 14-16, each spacer 82 includes an elongated first portion 180; and a second portion 182 that adjoins the first portion 180 and extends from the first portion 180 at an angle of approximately 90 degrees. The first portion 180 has a slot 186 formed therein; the slot 186 extends in the lengthwise direction of the first portion 180. The second portion 182 has a slot 188 formed therein; the slot 188 extends in the lengthwise direction of the second portion 182.

The mounts 80 can be positioned on the spacers 82, as noted above. The spacers 82 facilitate adjustment of the distance, or spacing between the mount 80 the adjacent wall 53 of the column 32. One mount 80 is mounted on two of the spacers 82. The second portion 182 of each spacer 82 is secured to the mount 80 by a fastener 125. The fastener 125 is disposed in the slot 188 in the second portion 182, and in one of the holes 124 in the mounting portion 105 of the mount 80.

The first portion 180 of each spacer 82 is secured to one of the walls 53 of the column 32 by two fasteners 125 disposed in the slot 186 of the first portion 180, and in the two of the holes 190 in the wall 53. As can be seen in FIGS. 1 and 4, the two spacers 82 associated with each mount 80 are secured to the walls 53 that are perpendicular to the wall 53 that faces the mount 80. The elongated slot 186 allows the user to vary the spacing between the mount 80 and the adjacent wall 53, i.e., the wall 53 that faces the mount 80. In particular, the user can move the mount 80 toward or away from the adjacent wall 53 before tightening the fasteners 125 that secure the spacers 82 to the column 32. The mount 80 can be positioned so as to place the mount 80 in an optimum position to secure the particular extrication tool 100 being restrained by the mount 80. Once the mount 80 has been placed in the desired position in relation to the adjacent wall 53, the fasteners 125 can be tightened to secure the spacers 82, and the attached mount 80, in place.

The vertical position of each mount 80 can be selected by aligning the slots 186 of the first portions 180 of each associated spacer 82 with a particular pair of holes 190 in the associated wall 53 of the column 32. The multiple rows of holes 190 disposed in different vertical positions provides the user with flexibility to install the spacers 82, and their associated mounts 80, at vertical positions that optimally accommodate tools 100 of different heights and different shapes.

In the configuration depicted in FIGS. 1 and 4, four of the mounts 80 are positioned on the spacers 82. Each mount 80 is located at the same height, or vertical position, as another mount 80 positioned on the opposite side of the column 32, i.e., a first pair of the mounts 80 is located on opposite sides of the column 32 at a first vertical position; and a second pair of the mounts 80 is located on opposite sides of the column 32 at a second vertical position. The spacers 80 associated with the first pair of mounts 80 overlap; and the spacers 82 associated with the second set of mounts 80 likewise overlap, as can be seen in FIGS. 1 and 4. Each overlapping set of spacers 82 is secured to the underlying wall 53 by two fasteners 125. This arrangement permits two of the mounts 80 to be positioned at the same vertical position on opposite sides of the column 32, while permitting the spacing between each of the two mounts 80 and its adjacent wall 53 to be adjusted independent of the other mount 80.

The spacers 82 thus provide the user with flexibility to adjust the horizontal positions of the mounts 80 to accommodate tools 100 having different shapes and different external dimensions. The ability to vary the spacing between the mounts 80 and the walls 53 of the column 32 can allow a particular tool 100 to be stowed in an upright positon when the shape and/or dimensions of the tool 100 otherwise would prevent the tool 100 from remaining upright were the mount 80 to be mounted directly on the wall 53. Elongated tools 100 such as hydraulic extrication tools are relatively heavy, with most of the weight being concentrated toward the rearward end of the tool 100. Thus, stowing such a tool 100 in a tilted orientation, with the rearward end up, can increase the potential for the tool 100 to place excessive stress on the mounts 80 and the column 32, and can make the tool 100 unstable, especially when to tool 100 is being transported in an emergency vehicle experiencing high rates of acceleration and deceleration; bumps and other road obstacles; and high-speed turns. The spacers 82 can provide a means for quickly, easily, and reliably adjusting the horizontal and vertical positions of the mounts 80 to allow a variety of tools 100 of different shapes and dimensions to remain upright, and stable, when stowed on the tool holder 10.

Figure 18:
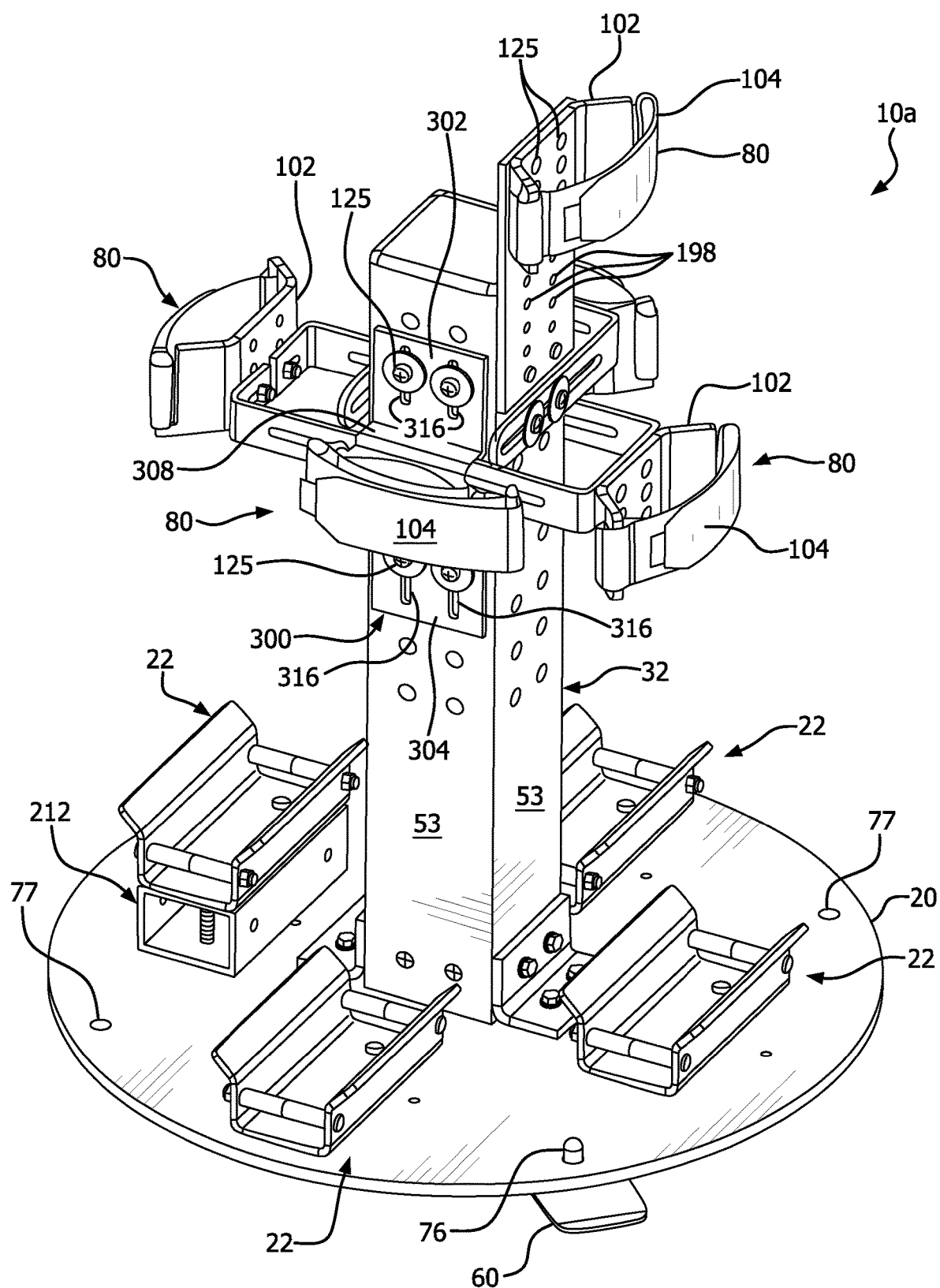
FIG. 18 is perspective view of an alternative embodiment of the tool holder shown in FIGS. 1-4.
Figure 19:
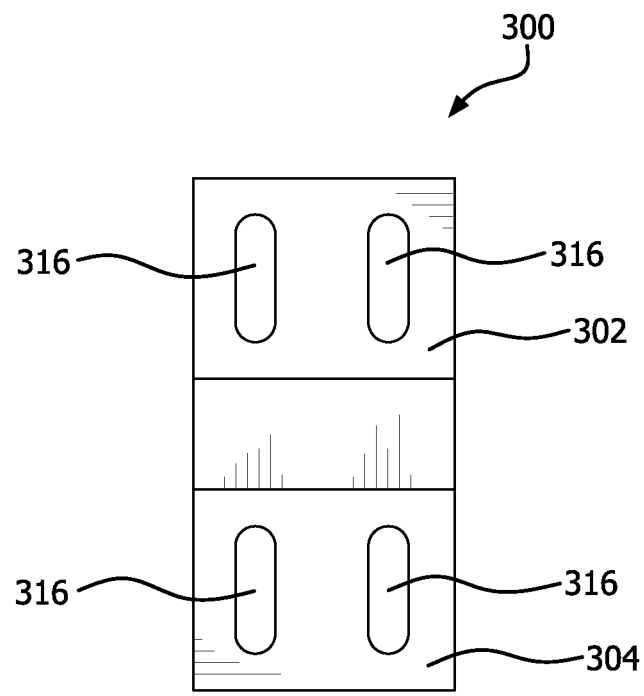
FIG. 19 is a front view of a hanging ram assembly of the tool holder shown in FIG. 18.
Figure 20:
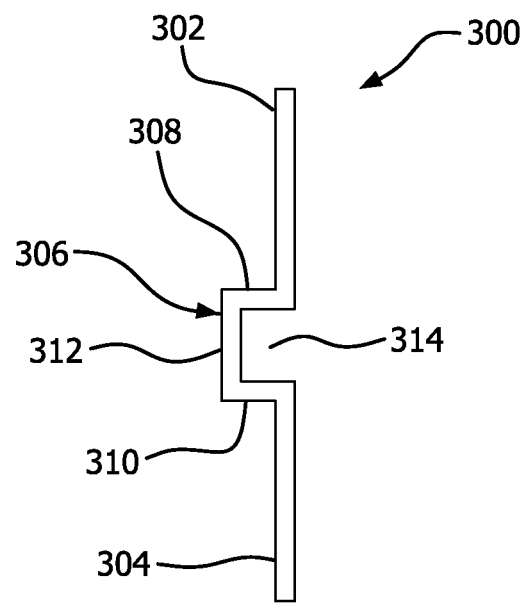
FIG. 20 is a side view of the hanging ram assembly shown in FIG. 19.

FIG. 18 depicts an alternative configuration of the tool holder 10 in the form of a tool holder 10a. The tool holder 10a is equipped with a hanging ram assembly 300. The hanging ram assembly 300 permits a third mount 80 to be positioned at the same height as two other mounts 80 positioned on spacers 82.

The ram assembly 300 incudes a first major portion 302, a second major portion 304, and an intermediate portion 306. The intermediate portion 306 has a first side portion 308 that adjoins the first major portion 302 at an approximate right angle; and a second side portion 310 that adjoins the second major portion 304 at an approximate right angle. The intermediate portion 306 also includes a top portion 312 that adjoins first side portion 308 and the second side portion 310 at an approximate right angle. The first and second side portions 308, 310 and the top portion 312 define a channel 314. The channel 314 receives the overlapping first portions 180 of two spacers 82 supporting the mounts 80 on opposite sides of the column 32.

The first and second major portions 302, 304 of the hanging ram assembly 300 have vertically-oriented slots 316 formed therein. The slot 316 are configured to align with the holes 190 in the walls 53 of the column 32. The slots 316 receive fasteners 125 that engage the corresponding holes 190 and secure the ram assembly 300 to the wall 53.

Another of the mounts 80 is mounted on the intermediate portion 306 of the hanging ram assembly 300, as shown in FIG. 18. The intermediate portion 306 has holes formed therein (not shown) that receive fasteners that secure the mount 80 directly to the intermediate portion 306.

d. Extension Plate

Figure 17:
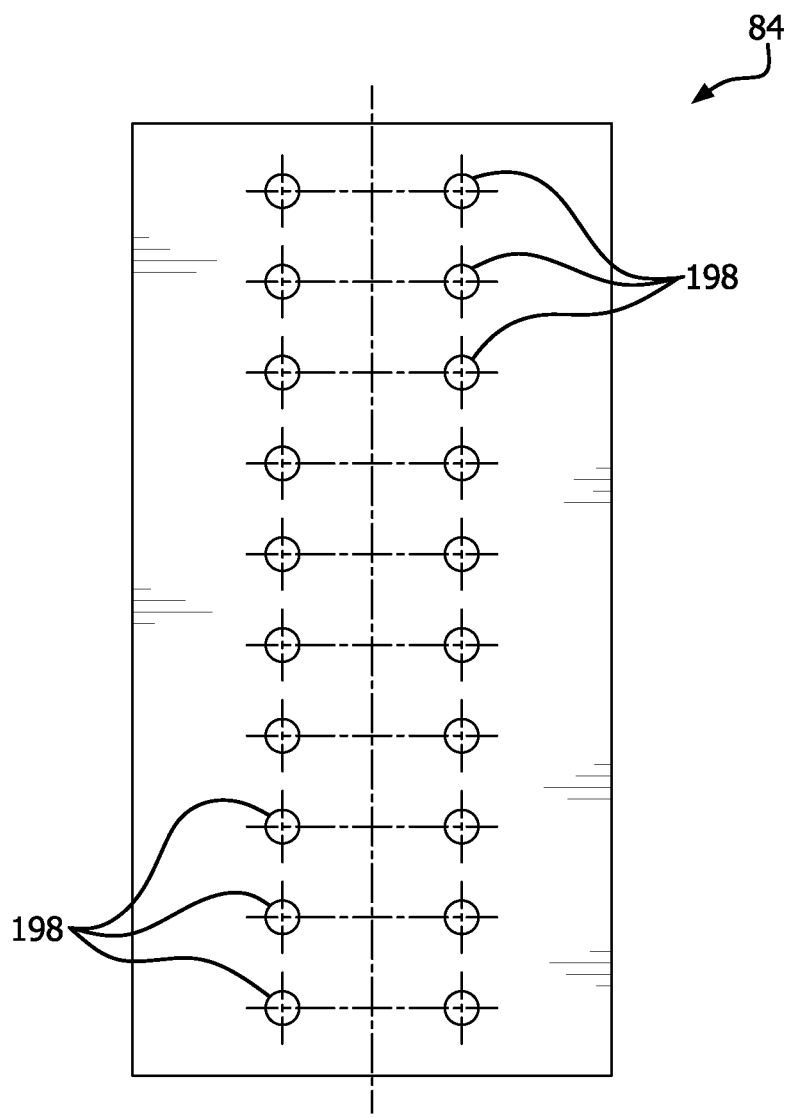
FIG. 17 is a front view of an extension plate of the tool holder shown in FIGS. 1-4.

Referring to FIGS. 1 and 17, one of the mounts 80 is mounted on the extension plate 84. The extension plate 84 has a substantially rectangular shape, and has a width, or side to side dimension, that is about equal to the width of the walls 53 of the column 32. The extension plate 84 has two columns of holes 198 formed therein. The holes 198 are configured in a pattern that substantially matches the pattern of the holes 190 in the walls 53 of the column 32. The extension plate 84 allows the mounts 80 to be mounted at heights greater the uppermost surface of the column 32. This feature can be used, for example, when an oversized tool 100 is being stowed on the tool holder 10. As discussed above, securing the upper end of the tool 100 can be critical to maintaining the tool 100 in an upright, and stable, orientation on the tool holder 10. The extension plate 84, by permitting the upper end of an oversize tool 100 to be secured directly to one or more of the mounts 80, thus can help to maintain oversize tools 100 in a stable condition when stowed on the tool holder 10.

The extension plate 84 can be installed on one of the wall 53 of the column 32 by positioning the extension plate 84 at or near a desired vertical position in relation to the wall 53; aligning two or more of the holes 198 on the extension plate 84 with corresponding holes 190 in the wall 53; and installing two or more of the fasteners 125 in the aligned pairs of holes 190, 198. The mount 80 can be mounted on the extension plate 84 by aligning the holes 124 in the mounting portion 105 of the mount 80 with two or more of the holes 198 in the extension plate 84, and inserting two or more of the fasteners 125 in the aligned pair of holes 124, 198.

e. Tool Tip Rests/Risers

Referring to FIG. 1, each tool tip rest 22 includes a bottom portion 200, and two adjoining side portions 202. The bottom portion 200 is secured to the upper surface of the rotating platform 20 by a suitable means such as fasteners. The bottom portion 200 and the side portions 202 define a volume 204 that receives an end portion of the extrication tool 100. The tool tip rest 22 also comprises two bars 206. The bars 206 are secured to opposite ends of the side portions 202 as depicted in FIG. 1. The side portions 202 and the bars 206 constrain the end portion of the extrication tool 100 from substantial lateral movement.

Each tool tip rest 22 also includes two angled members 208 that adjoin the respective upper ends of the two side portions 202. The angled members 208 are angled upwardly and outwardly as shown in FIG. 1, and help to guide the end portion of the extrication tool 100 into the volume 204. As discussed above, the tool holder 10 can be used to stow a hydraulic extrication tool having clippers located at its forward end. In such applications, the clippers can be positioned in, and restrained by the tool tip rest 22, while the rearward end of the extrication tool is restrained by one of more of the mounts 80.

FIG. 1 also depicts a riser 212 positioned below one of the tool tip rests 22. The riser 212 has a bottom portion 214, two adjoining side portions 216, and a top portion 218 adjoining the side portions 216. The riser 212 a width and a length about equal to those of the tool tip rest 22. The bottom portion 214 of the riser 212 is secured to the upper surface of the rotating platform 20 by a suitable means such as fasteners.

One of the tool tip rests 22 is positioned on top of the riser 212. The bottom portion 200 of the tool tip rest 22 is secured to the top portion 218 of the riser 212 by a suitable means such as fasteners. The riser 212 can be used to raise the tool tip rest 22, to adjust the vertical position of the tool 100 associated with the tool tip rest 22. This feature can be used, for example, when two tools 100 of different overall lengths are being stowed on opposite sides of the tool holder 10; and two sets of spacers 82, located at the same height, are being used to position the mounts 80 associated with each of the tools 100. This particular configuration is depicted in FIG. 1. As can be seen in FIG. 1, the riser 212 can raise the vertical position of the shorter tool 100, so that the shorter tool 100 can be secured to a mount 80 located at about the same height as the mount 80 associated with the longer tool 100.

I claim:

1. A carousel-type tool holder for holding one or more elongated tools, comprising:
   a base;
   a platform mounted for rotation on the base and configured to support the elongated tool;
   a column mounted on the platform and extending from the platform substantially in a vertical direction;
   a mount configured to restrain the elongated tool when the elongated tool is positioned on the platform; and
   a spacer mounted on the column and comprising a first portion, and a second portion that adjoins the first portion and extends substantially perpendicular to the first portion, wherein: the first portion has a slot formed therein and extending substantially in the horizontal direction; the mount is mounted on the second portion of the spacer; and the slot is configured to receive at least one fastener that secures the spacer to the column so that the spacer is configured to be secured to the column in a plurality of different horizontal positions in relation to the column and a spacing between the mount and the column can be varied; and a tool tip rest configured to receive an end of the tool; and a riser mounted on the platform, wherein the tool tip rest is mounted on the riser and the riser is configured to elevate the tool tip rest in relation to the platform.

2. The tool holder of claim 1, wherein:
   the spacer is a first spacer;
   the tool holder further comprises a second spacer;
   the mount is mounted on the first and second spacers;
   the column has a first wall, a second wall positioned opposite the first wall, and a third wall adjoining the first and second walls;
   the first spacer is mounted on the first wall;
   the second spacer is mounted on the second wall; and
   the first and second spacers are configured to be secured to the column in a plurality of different horizontal positions in relation to the column so that a spacing between the mount and the third wall can be varied.

3. The tool holder of claim 1, wherein the column comprises a wall having a plurality of holes formed therein and located a different vertical positions; and the holes are configured to receive the fastener so that a vertical position of the spacer and the mount in relation to the column can be varied.

4. The tool holder of claim 1, further comprising an extension plate configured to be mounted on the column so that a portion of the extension plate extends higher than an uppermost surface of the column; wherein the mount is a first mount and the tool holder further comprises a second mount mounted on the extension plate.

5. The tool holder of claim 4, wherein the column comprises a wall having a plurality of holes formed therein and located at different vertical positions; the extension plate has a plurality holes formed therein and arranged in a pattern that substantially matches a pattern of the holes in the column; and the extension plate is configured to be attached to the wall by fasteners disposed in two or more of the holes in the wall and two or more of the holes in the extension plate.

6. The tool holder of claim 1, further comprising:
   a shaft mounted on the base;
   an upper bearing assembly mounted on the shaft proximate an upper end of the shaft; and a lower bearing assembly mounted on the shaft proximate a lower end of shaft, wherein the column is connected to the upper and lower bearing assemblies and is configured to rotate in relation to the shaft by way of the first and second bearing assemblies.

7. A carousel-type tool holder, comprising:

a base;

a platform mounted for rotation on the base and configured to support an elongated tool, the platform having an opening formed therein;

a column mounted on the platform;

a mount connected to the column and configured to restrain the elongated tool when the elongated tool is positioned on the platform;

a locking tab secured to the base, the locking tab comprising: a first portion secured to the base, having a substantially horizontal orientation, and being located below the platform; a second portion adjoining the first portion, having a substantially vertical orientation, and being located below the platform; and a third portion adjoining the second portion, having a substantially horizontal orientation, and extending beyond an outer circumference of the platform; and a projection mounted on the third portion of the locking tab, wherein: the projection and the locking tab are configured so that the projection aligns with and becomes disposed in the opening when the platform is located at a predetermined angular position in relation to the base; interference between the projection and the platform when the projection is disposed in the opening prevents substantial rotation of the platform in relation to the base; and the locking tab is further configured to resiliently deflect and move the projection out of the opening when the third portion is subjected to a downward force.

8. The tool holder of claim 7, wherein:

the opening is a first opening and the platform has a second opening formed therein;

the predetermined angular position of the platform in relation to the base is a first predetermined angular position of the platform in relation to the base; and the projection and the locking tab are further configured so that the projection aligns with and becomes disposed in the second opening when the platform is located at a second predetermined angular position in relation to the base.

9. The tool holder of claim 8, wherein:

the platform has a third and a fourth opening formed therein;

the projection and the locking tab are further configured so that: the projection aligns with and becomes disposed in the third opening when the platform is located at a third predetermined angular position in relation to the base; and the projection aligns with and becomes disposed in the fourth opening when the platform is located at a forth predetermined angular position in relation to the base;

the first opening is angularly spaced from the second and the fourth openings by about 90 degrees;

the second opening is angularly spaced from the third opening by about 90 degrees; and the third opening is angularly spaced from the fourth opening by about 90 degrees.

10. The tool holder of claim 7, wherein the projection is an index pin.

* * * * *